United States Patent [19]

Heerkens

[11] Patent Number: 5,117,290
[45] Date of Patent: May 26, 1992

[54] CIRCUIT ARRANGEMENT IN A PICTURE DISPLAY DEVICE, COMPRISING A VIDEO SIGNAL PROCESSING CIRCUIT AND A LINE SYNCHRONIZING CIRCUIT

[75] Inventor: Henricus J. Heerkens, Eindhoven, Netherlands

[73] Assignee: U.S. Philips Corporation, New York, N.Y.

[21] Appl. No.: 580,240

[22] Filed: Sep. 7, 1990

[30] Foreign Application Priority Data

Oct. 18, 1989 [NL] Netherlands ............. 8902579

[51] Int. Cl.⁵ .................................. H04N 5/06
[52] U.S. Cl. ................................ 358/158; 358/148
[58] Field of Search .............. 358/158, 159, 148, 17

[56] References Cited

U.S. PATENT DOCUMENTS

| | | | |
|---|---|---|---|
| 4,081,834 | 3/1978 | Takamiya et al. | 358/158 |
| 4,214,260 | 7/1980 | Van Straaten | 358/148 |
| 4,535,358 | 8/1985 | Duijkers | 358/158 |
| 4,574,307 | 3/1986 | Nillesen | 358/158 |
| 4,791,488 | 12/1988 | Fukazawa et al. | 358/158 |
| 4,802,009 | 1/1989 | Hartmeier | 358/158 |
| 4,871,951 | 10/1989 | Teuling | 358/158 |
| 4,872,055 | 10/1989 | Teuling et al. | 358/148 |
| 5,008,659 | 4/1991 | Hovens | 358/159 |

FOREIGN PATENT DOCUMENTS 0239102 9/1986 Denmark.
0271562 11/1987 Japan.

Primary Examiner—James J. Groody
Assistant Examiner—Jeffrey S. Murrell
Attorney, Agent, or Firm—Edward W. Goodman

[57] ABSTRACT

Circuit arrangement in a picture display device, including a video signal processing circuit and a line synchronizing circuit with a clock signal the frequency of which is coupled to the line frequency. To eliminate a ripple, which is present in the control signal for the line generator during the occurrence of the line synchronizing pulses and which causes a disturbance when reading the video information by means of a clock signal, a compensation signal is generated which has the same frequency as the signal from the generator and which is applied to the control input of the generator, the signal at the control input being substantially constant throughout the line period in the synchronous state of the line synchronizing circuit.

5 Claims, 3 Drawing Sheets

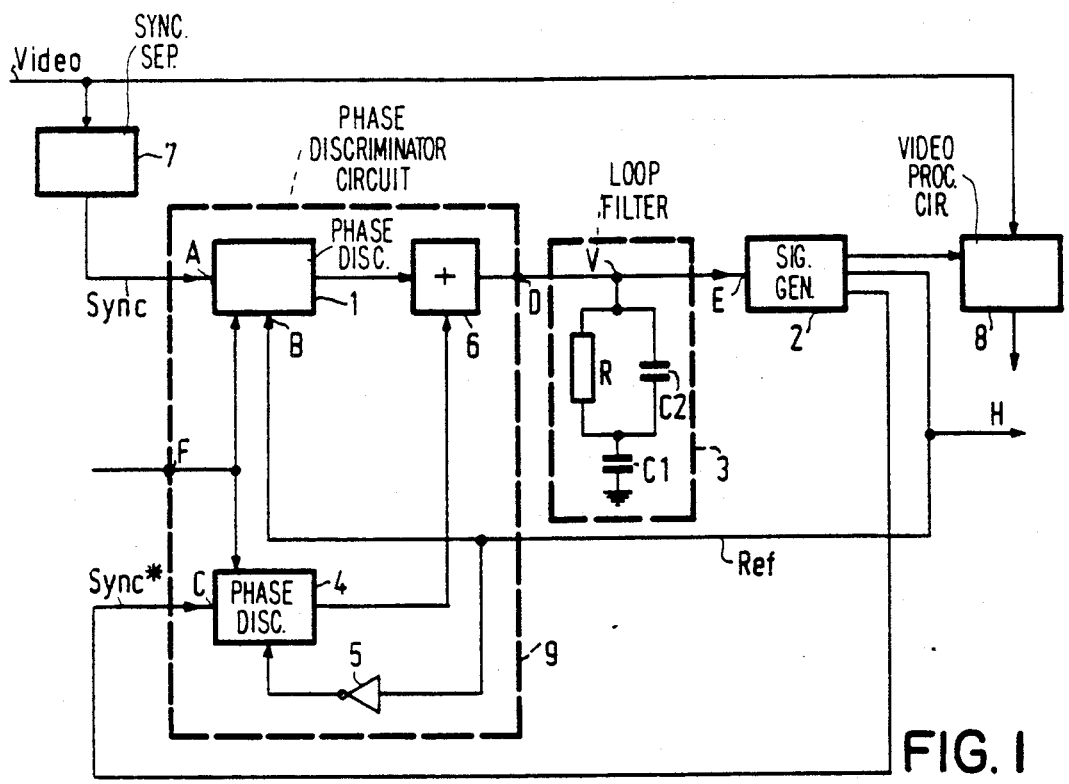
FIG. 1
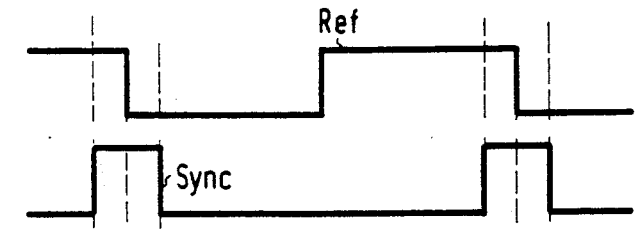
FIG. 2a
FIG. 2b
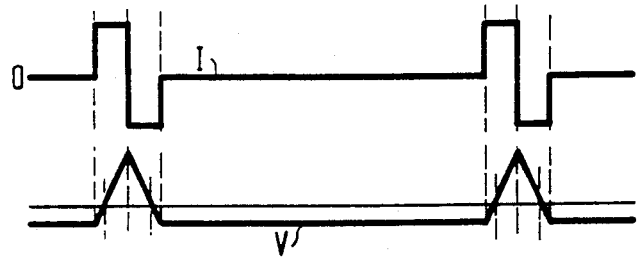
FIG. 2c
FIG. 2d
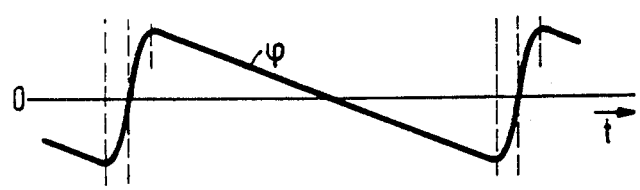
FIG. 2e

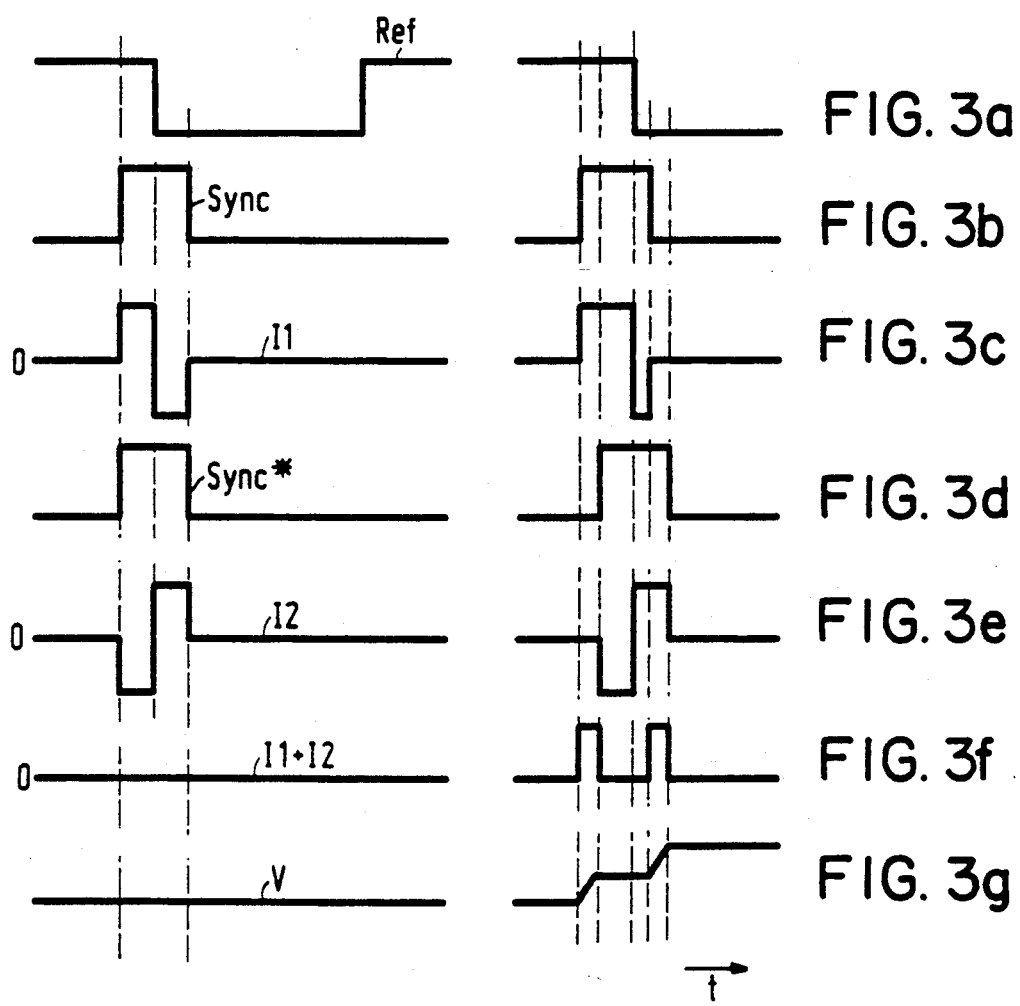

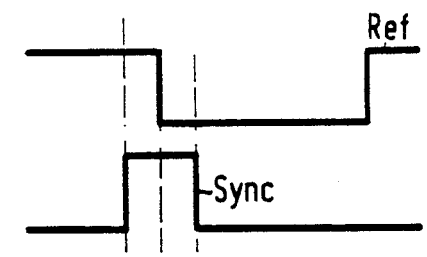
FIG. 4a
FIG. 4b
FIG. 4c
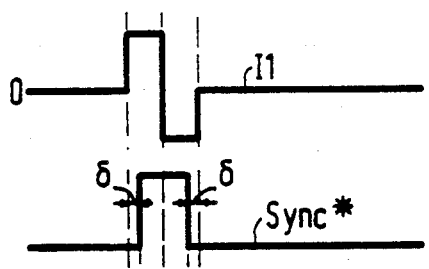
FIG. 4d
FIG. 4e
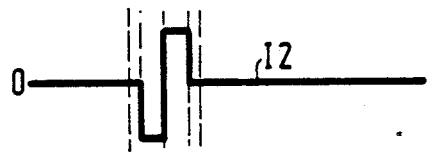
FIG. 4f
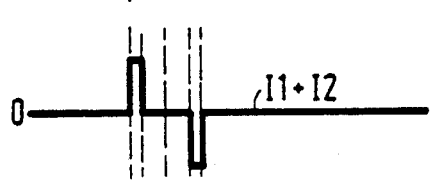
FIG. 4g
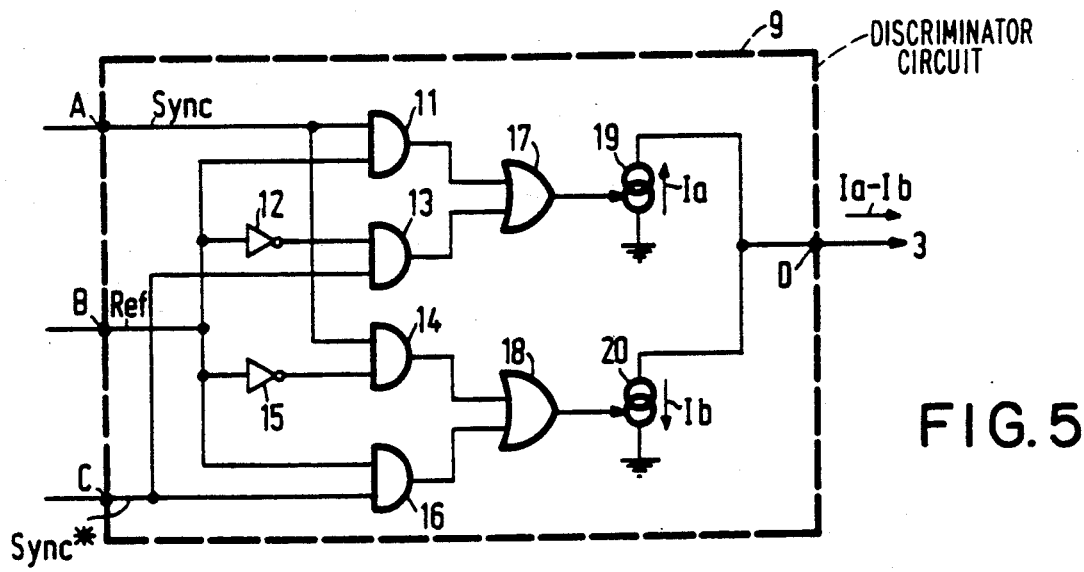
FIG. 5

CIRCUIT ARRANGEMENT IN A PICTURE DISPLAY DEVICE, COMPRISING A VIDEO SIGNAL PROCESSING CIRCUIT AND A LINE SYNCHRONIZING CIRCUIT

BACKGROUND OF THE INVENTION

1. Field of the Invention

The invention relates to a circuit arrangement in a picture display device, comprising a video signal processing circuit for an incoming video signal and a line synchronizing circuit for generating a reference signal for the horizontal scanning on a picture display screen, a signal generator for generating the reference signal and a clock signal for the video signal processing circuit, and a phase control loop for controlling the signal generator, said phase control loop comprising a phase discriminator circuit having a first input for receiving a line synchronizing signal which is present in the incoming video signal, a second input for receiving the reference signal and an output which is coupled to a loop filter and to a control input of the signal generator for applying a control signal to said input, the reference signal having the same frequency and substantially the same phase as the line synchronizing signal in the synchronous state of the control loop, and the clock signal frequency being coupled to the frequency of the reference signal.

2. Description of the Related Art

Such a circuit for processing video signals, for example, colour television signals, is proposed in the non-prepublished Netherlands Patent Application 8801415 (PHN 12.586) corresponding to U.S. Pat. No. 4,926,280. The video signal processing circuit described in this Application is a digital circuit with a clock signal for sampling, storing, processing and reading the video information. The frequency of the clock signal is coupled to the frequency of the reference signal so that samples of successive lines are displayed one below the other on the display screen, with the advantage that said processing operations of the video information, for example, interpolation are effected in a simple manner.

However, it has been found that even at a line frequency which has remained constant, the frequency of the reference signal may be disturbed, namely during the occurrence of the pulses which are present in the line synchronizing signal. In fact, in the synchronous state of the phase control loop, the output signal of the phase discriminator has a given polarity during the first half of a line synchronizing pulse with respect to a substantially constant value which this signal has between the pulses, and this signal has the other polarity during the second half of the pulses. After the pulse said signal assumes the same value as before. In the non-synchronous state of the phase control loop the disturbance is also present, be it that the value of the signal after the occurrence of the pulse is not equal to the value before it, so that the frequency and/or the phase of the oscillator are controlled. It is apparent therefrom that the control signal has a ripple resulting in a variation of the frequency and hence of the phase of the reference signal. If there is no phase difference between the signals at the inputs of the phase discriminator, this phase shift is exactly zero over one line period. Said disturbance is described, for example, in Netherlands Patent Application 8702538 (PHN 12.303).

In many applications of such line phase control loops, the above-mentioned disturbance is not a noticeable impediment, but in high-quality picture display devices, the disturbance may cause a display error which is unacceptable. In fact, the video information processing operations introduce delays, with the result that the video information can also be read during the occurrence of the line synchronizing pulses in the incoming video signal, in which period the clock is thus disturbed. For example, if the requirement is imposed that the phase shift caused by the disturbance and expressed in time must be smaller than 5 ns during a line period, it appears that conventional line phase control loops cause a larger disturbance, for example, approximately 14 ns in the case of the integrated circuit TDA 2579 of Philips, and they are therefore not readily usable.

The disturbance may be reduced by choosing a larger time constant for the line phase control loop, but this results in a poorer behavior of the loop during lock-in. The detrimental effect of the disturbance can be prevented by ensuring that video information cannot be read during the occurrence of a line synchronizing pulse. However, this requires an extra memory. The circuit described in Netherlands Patent Application 8203556 corresponding to U.S. Pat. No. 4,574,307 has a switch-over facility with which the reference signal is controlled to the leading edge of the line synchronizing pulse in the synchronous state of the control loop. In this case the disturbance is supplied by the reference signal and it is smaller as the pulse in this signal is shorter. Its drawbacks are a poorer noise behavior, because the control information is given by only one edge of the synchronizing pulse, and the phase error which is produced during switching. Another possibility is to sample the control signal first and retain it for one line period so that a constant control signal for the signal generator and hence a fixed frequency are obtained. However, since the phase error is determined only once per line, the control loop has already a sampling character. It is found that this second sampling operation changes a second-order loop to a third-order loop, which results in a very poor step response, particularly in fast loops. It starts to oscillate in an unacceptable way.

SUMMARY OF THE INVENTION

It is an object of the invention to provide a circuit arrangement of the type described above in which the described disturbance does not have any detrimental consequences for the video information display, and to this end a circuit arrangement according to the invention is characterized in that a compensation circuit is coupled to the signal generator for generating a compensation signal during the occurrence of pulses in the line synchronizing signal and for applying the compensation signal to the control input of the generator, the repetition frequency of the compensation signal being the frequency of the reference signal and the signal at said input being substantially constant throughout the period of the line synchronizing signal in the synchronous state of the phase control loop.

This measure yields a compensation signal having such a variation in time that it has a ripple during the occurrence of the line synchronizing pulses. In the case of a correct design, this ripple compensates the ripple in the output signal of the phase discriminator so that the signal at the control input of the signal generator is substantially constant in the synchronous state of the phase control loop. The frequency of the reference signal does not substantially vary and consequently the clock signal frequency for the video processing does not vary either. If there is a phase error between the incoming synchronizing signal and the reference signal, there will be a variation in the control signal and consequently an extra phase shift, but in this case the requirement that the frequency of the generator should be constant during a line does not apply. Phase errors appear in the displayed picture until the generator has the correct frequency and substantially the correct phase. These errors prevail over the clock errors. Since the phase of the compensation signal is fixed with respect to the reference signal under all circumstances, the contribution of the compensation signal to the control signal is constant and this signal does not influence the behavior of the control loop.

The circuit arrangement is advantageously characterized in that the phase discriminator circuit has a third input for receiving a second signal from the signal generator, which signal comprises pulses essentially having the same duration as the line synchronizing pulses and occurring substantially simultaneously with the line synchronizing pulses in the synchronous state of the control loop, the signal at the output of the phase discriminator circuit comprising the compensation signal. Due to this measure the compensation signal is generated by the phase discriminator circuit itself.

In a simple embodiment the circuit arrangement is characterized in that the phase discriminator circuit comprises a first and a second phase discriminator, the first phase discriminator having a first input which is the first input of the phase discriminator circuit, and a second input which is the second input of the phase discriminator circuit, the second phase discriminator having a first input which is the third input of the phase discriminator circuit, and a second input which is coupled to the second input of the phase discriminator circuit, the outputs of the first and second phase discriminators being coupled together and to the output of the phase discriminator circuit. If correctly designed, the second phase discriminator generates a signal which compensates the output signal of the first phase discriminator so that there is no ripple in the control signal.

The two phase discriminators can be combined in a simple manner. The circuit arrangement is then characterized in that the phase discriminator circuit comprises a first source which is controlled by the signals at the first input and at the second input of said circuit, and which is coupled to its output for applying information to a storage element, and a second source which is controlled by the signals at the second input and at the third input of said circuit, and which is coupled to said output for withdrawing information from the storage element, the resultant information present in the storage element constituting the control signal which is to be applied to the control input of the signal generator.

BRIEF DESCRIPTION OF THE DRAWINGS

The invention will now be described in greater detail by way of example with reference to the accompanying drawings, in which:

FIG. 1 shows a basic circuit diagram of a circuit arrangement according to the invention;

FIGS. 2a-2e show waveforms which are useful for understanding the invention;

FIGS. 3a-3g show waveforms occurring in the circuit arrangement of FIG. 1 in an ideal case;

FIGS. 4a-4g show waveforms occurring in the circuit arrangement of FIG. 1 in a more realistic case; and FIG. 5 shows a more detailed circuit diagram of an embodiment of the phase discriminator circuit of FIG. 1.

DESCRIPTION OF THE PREFERRED EMBODIMENT

In FIG. 1 the reference numeral 1 denotes a phase discriminator. A pulsatory line synchronizing signal Sync is applied to a first input A thereof and a rectangular reference signal Ref originating from a controllable signal generator 2 is applied to a second input B. A signal, which is a measure of the phase difference between the two input signals and which is smoothed by a loop filter 3 connected between a point D and ground, is present at an output of phase discriminator 1 which is connected to the point D via a stage to be described hereinafter. Filter 3 comprises, for example, the series arrangement of a capacitor C1 of 10 $\mu$F and the parallel arrangement of a capacitor C2 of 100 nF and a resistor R of 820 $\Omega$. The voltage V, which is present across the filter, is a control signal which is applied to a control input E of controllable signal generator 2 for controlling the frequency and/or the phase of the signal Ref.

Elements 1, 2 and 3 constitute a phase control loop of known type. In the non-synchronous state of the control loop, in which the phase difference between the signals at points A and B is not zero, generator 2 is corrected in such a way that said phase difference becomes smaller until it becomes substantially zero after some time. In the then prevailing synchronous state the signal Ref has the same frequency and substantially the same phase as the incoming line synchronizing signal. The circuit arrangement may also comprise stages, which are not shown in FIG. 1 for the sake of simplicity, for improving the behavior of the circuit arrangement, for example, a gating pulse generator for generating gating pulses to enable the phase discriminator every time during a part of the line period, and a coincidence detector which receives the signals present at points A and B for fixing the synchronous state and for switching parts of the circuit arrangement. The signal Ref is also applied to circuits not shown in FIG. 1, in which circuits it is processed in known manner for obtaining a signal which is suitable for the line (horizontal) deflection in a picture display tube, for example, a second phase control loop for eliminating phase errors which may be produced in the line deflection circuit H. The signal generator 2 generates a plurality of local signals. One of these signals is the signal Ref whose nominal frequency is the line frequency. Another signal, which is generated by generator 2, is a clock signal for a video signal processing stage 8, the clock signal frequency being a multiple of the line frequency. Generator 2 may be implemented, for example, as the combination of a voltage-controlled line oscillator and a clock signal oscillator, or as a clock signal oscillator having a higher frequency. In the latter case a frequency divider circuit is arranged in the line between the oscillator and point B for obtaining the signal Ref. For further information on this type of arrangement, reference may be had to U.S. Pat. No. 4,214,260. Stage 8 receives an incoming video signal which is also applied to a synchronizing signal separator 7 for deriving the line synchronizing signal Sync in known manner, which signal is applied to point A.

FIGS. 2a-2e show some waveforms in the case of the synchronous state of the control loop, namely the signal Ref from generator 2 in FIG. 2a the incoming line synchronizing signal Sync in FIG. 2b, and an output current I of discriminator 1 in FIG. 2c. FIG. 2d shows the result of the integration by means of filter 3 of this current, i.e. the control voltage V. The signal Ref has a falling edge at an instant which substantially coincides with the center of a synchronizing pulse. After the occurrence of the pulse, current I has a substantially constant value. As compared with this value, the current is positive during the first half of the pulse and negative during the second half, while it has substantially the same value as during the first half. The voltage of FIG. 2d is also constant between two pulses. During the occurrence of a pulse, voltage V approximately has a triangular shape which is symmetrical with respect to the center of the pulse. The exact shape of the ripple consists of the sum of a plurality of e powers. During the occurrence of the pulse, this ripple causes a variation of the frequency of the reference signal, which variation is substantially proportional to the voltage variation. It is apparent therefrom that the frequency and hence the phase variation of the signal at point B are disturbed. The average value of the frequency over one line period is equal to the nominal line frequency; in the interval between the pulses, the frequency slightly deviates from the nominal value. The latter does not have any detrimental consequences because this static error is small and is the same for all line periods and hence for all lines written on the display screen.

FIG. 2e shows the variation of the phase $\phi$ of signal Ref with respect to its nominal value, which variation is obtained by integration of the frequency variation. In this case the approximation with the triangular form is used. In the interval between the synchronizing pulses, $\phi$ varies substantially linearly. During the occurrence of a pulse, the curve of FIG. 2e has a minimum and a maximum at the instants when the frequency error is zero, and it has the largest slope in the center of the pulse where the frequency error is maximum. In the synchronous state of the loop, the total phase error is zero over one period and the curve of FIG. 2e is symmetrical with respect to the zero axis.

The maximum phase error can be computed as follows. If the integrated circuit of the Philips type TDA 2579 is used, it holds that the current of discriminator 1 is 2 mA at a maximum and that the constant $K_o$ of oscillator 2 is approximately $4000.\pi$ rad/V.s. During the first half of a line synchronizing pulse, i.e. during approximately $t=2.35$ $\mu$s (European television standard), voltage V is approximately equal to I.t/C2 and the phase shift due to this disturbance is $K_o$ times the integral of the voltage, i.e. $K_o.I.t^2/2C2 = 69.4*10^{-5}$ rad. The corresponding time error is obtained by dividing this result by the angular frequency, i.e. $2\pi*15625$ rad/s so that an error of approximately 7 ns is found. The disturbance is thus 14 ns for the entire pulse, which is more than the 5 ns which are still acceptable. Consequently, an error leading to an incorrect display of the video information occurs at the clock signal frequency for stage 8.

To eliminate this error, the circuit arrangement of FIG. 1 comprises a compensation circuit including a second phase discriminator 4. A second signal Sync* is applied from generator 2 to a first input C thereof. This signal comprises pulses having substantially the same period as the incoming line synchronizing pulses at input A and it has a fixed phase relation with respect to the first signal Ref from generator 2, namely such that the signal Sync* has the same phase as the signal Sync in the synchronous state of the control loop with elements 1, 2 and 3. The signal Ref is inverted by means of an inverter stage 5 and the signal obtained is applied to a second input of discriminator 4. Each output signal from discriminators 1 and 4 is applied to an input of an adder stage 6, an output of which is connected to the previously mentioned point D. Elements 1, 4, 5 and 6 constitute a phase discriminator circuit 9 having three inputs A, B and C and an output D. If the discriminator output signals are currents, stage 6 can be reduced to a node.

FIGS. 3a-3g show as a function of time, the signal Ref in FIG. 3a, the signal Sync in FIG. 3b, the output current I1 of discriminator 1 in FIG. 3c, the signal Sync* in FIG. 3d, the output current I2 of discriminator 4 in FIG. 3e, the current I1+I2 supplied by stage 6 in FIG. 3f and the resultant control voltage V at the control input E of generator 2 in FIG. 3g. The waveforms in the synchronous state of the control loop are shown at the left in the FIGS. 3a-3g and in a non-synchronous state at the right. It is apparent from the left-hand part of the FIGS. 3a-3g that currents I1 and I2 have opposite directions during the occurrence of a synchronizing pulse, both in the first half and in the second half of the pulse. In the case of a suitable design, these currents compensate each other exactly so that the sum of these currents is zero and voltage V no longer has any ripple. The frequency of the signal Ref thus remains unchanged during the entire period and a phase error does not occur. The same applies to the clock signal.

In the non-synchronous state of the control loop shown at the right in FIGS. 3a-3g, the signal in FIG. 3b is not symmetrical with respect to the signal in FIG. 3a. In this state the signals Sync and Sync* do not have the same phase, because the phase of the signal Sync* is fixed with respect to the signal Ref. During the occurrence of the signals from generator 2, the sum I1+I2 is zero during at most a part of the time; in this part voltage V does not vary. It is apparent from FIG. 3g that voltage V does vary in the intervals in which a pulse in the signal Sync and a pulse in the signal Sync* do not coincide, which causes an extra phase shift, but in this case the requirement does not apply that the frequency of generator 2 must be constant during a line. In the interval between the pulses, voltage V substantially has the value which is required for controlling the frequency and the phase of the generator to the desired values at which the phase errors, which occur due to the phase deviation between the signals at points A and B, prevail over the extra phase shift due to the ripple of voltage V. Since the phase location of the signal Sync* is fixed with respect to the signal Ref under all circumstances, and since current I2 is independent of said phase deviation, the contribution of the signal Sync* to the control voltage is constant and discriminator 4 does not influence the behavior of the control loop. At worst, it may introduce a small static error in the synchronous state if the average value of current I2 is not zero, which error, like the above-mentioned static error, is of little significance. However, during lock-in this error causes a frequency deviation which increases every line. Consequently it may happen after some time that the generator no longer locks in. Discriminator 4 must therefore be designed in such a way that such an error cannot be produced. For the sake of safety it may be ensured that the error is not produced by switching off this discriminator during lock-in by means of the above-mentioned coincidence detector. In this way discriminator 4 is also inactive when siganl Sync is absent.

It will be clear that it is not possible to guarantee that the duration of the pulses in the signal Sync* is always equal to that of the pulses in the signal Sync, firstly because the line synchronizing pulses may have various time durations within the television standards and secondly because of tolerances in the circuit arrangement, particularly tolerances in the separator 7. FIGS. 4a-4g show the same waveforms as in the left-hand parts of FIGS. 3a-3g in which the pulse in FIG. 4d with $2*\delta$ is shorter than the synchronizing pulse in FIG. 4b and in which the time $\delta$ is supposed to be small with respect to the duration $T=4.7$ $\mu$s of this pulse. The maximum value of voltage V (FIG. 4g) is $I.\delta/C2$ and the phase shift caused thereby is substantially equal to $k_o \cdot I.\delta.T/C2 = 1.18 *10^3*\delta$ rad. For the integral to be calculated the ripple in FIG. 4g is approximated by a rectangle in this case. For the line frequency, this phase error corresponds to a time error of approximately $12*\delta$ ms. This is smaller than 5 ns if $\delta$ is smaller than 0.4 $\mu$s. A similar result applies if the pulse in FIG. 4d is slightly longer than the pulse in FIG. 4b. The pulse in the signal Sync* may thus be 0.8 $\mu$s longer or shorter than the synchronizing pulse. Since the variations within the standards are only + or $-0.2$ $\mu$s, a tolerance of + or $-0.6$ $\mu$s is left for the synchronizing signal separator and for generating the signal Sync*. It will also be clear that there may be a deviation between the output cu- rents of the two discriminators, so that the current $I1+I2$ from or to filter 3 is not zero in the left-hand part of FIG. 3f. As has been shown hereinbefore, a current of 2 mA causes a phase shift of 14 ns. Before an error of 5 ns is produced as a result of this deviation, it may thus be approximately 30%. It follows from the foregoing considerations that the compensation circuit with discriminator 4 is not very critical.

It is apparent from FIG. 3 that the currents I1 and I2 from the two phase discriminators are either zero, or unequal. For this reason discriminators 1 and 4 may be combined. It is apparent from FIG. 2 that discriminator 1 can be considered to comprise two current sources, namely a first source withdrawing a current from filter 3 if the signal Sync is high while the signal Ref is low, at which the current is otherwise zero, and a second source supplying a current to the filter when the two signals Sync and Ref are simultaneously high, at which the current is otherwise zero. These currents substantially have the same strength. FIG. 5 shows the diagram of a discriminator circuit 9 in which discriminators 1 and 4 are combined. In this ciruclt the signal Sync is applied to an AND gate 11 and to an AND gate 14 and the signal Sync* is applied to an AND gate 13 and to an AND gate 16. The signal Ref is applied to a second input of gate 11, to an inverter stage 12, to an inverter stage 15 and to a second input of gate 16. An output of stage 12 is connected to a second input of gate 13 and an output of gate 15 is connected to a second input of gate 14. An output of gate 11 and an output of gate 13 are each connected to an input of an OR gate 17, an output of which controls a current source 19 for activating this source. Similarly, an output of gate 14 and an input of gate 16 are each connected to an input of an OR gate 18, an output of which controls a current source 20 for activating this source. Sources 19 and 20 are intercon- nected and are connected to the output D of circuit 9 in such a way that the current Ia of source 19 flows from ground to point D and the current Ib of source 20 flows from point D to ground for charging and discharging, respectively, the capacitors in filter 3, which currents substantially have the same strength. It is apparent from FIG. 5 that Ia is not zero, when Sync is high while Ref is low or when Sync* and Ref are both high, and that Ib is not zero when Sync and Ref are both high and when Sync* is high while Ref is low. The resultant current Ia-Ib has the same variation as the current I1-I2 in FIG. 3f. Signals are applied to sources 19 and 20 so that these are only active during the occurrence of gate pulses and when signals Sync and Ref are substantially synchronous. If the signal applied to point A is a composite synchronizing signal with line synchronizing pulses and equalizing and field synchronizing pulses in the field blanking interval, i.e. pulses which have a different duration than the line synchronizing pulses and which may cause disturbances, known circuit arrangements comprise facilities for switching off the line phase discriminator during the equalizing and field synchronizing interval with the aid of a signal from a field synchronizing circuit. It will be evident that this case sources 19 and 20 are also deactivated in this interval. For the sake of simplicity, FIG. 5 does not show the relevant circuit parts. The arrows in FIG. 1 denote the supply lines of the blocking signals for discriminators 1 and 4 from an input F of circuit 9.

The invention provides a compensation for the disturbance which is otherwise caused by the line synchronizing pulses. It will be evident that some details in the circuit arrangements of FIGS. 1 and 5 may be realized in a different manner than described hereinbefore. For example, inverter stage 5 may be omitted if stage 6 is replaced by a subtractor stage. Elements 4 and 5 may be considered as a circuit for generating a voltage in conjunction with filter 3, which voltage has the same form as the voltage in FIG. 2d with the opposite polarity with respect to its average value during the occurrence of the line synchronising pulses, and for applying the obtained triangular voltage to the control input E of generator 2. It will be evident that said circuit arrangement can be implemented in another way, for example, by means of an up-down counter for counting the clock pulses, followed by a D/A converter, the counter being enabled between 2.35 $\mu$s before and 2.35 $\mu$s after the occurrence of the edge in FIG. 2a.

I claim:

1. A circuit arrangement in a picture display device, comprising an input for receiving a video signal, a video signal processing circuit coupled to said input for receiving said video signal, and a line synchronizing circuit also coupled to said input for generating a reference signal for horizontal scanning on a picture display device, said line synchronizing circuit including a signal generator for generating said reference signal as well as a clock signal applied to a clock input of said video signal processing circuit, and a phase control loop for controlling the signal generator, said phase control loop comprising a phase discriminator circuit having a first input for receiving a line synchronizing signal which is present in the video signal, a second input for receiving said reference signal and an output which is coupled, via a loop filter, to a control input of the signal generator for applying a control signal to said control input, said reference signal having the same frequency and substantially the same phase as the line synchronizing signal in the synchronous state of the phase control loop, and the clock signal having a frequency which is coupled to the frequency of the reference signal, characterized in that said line synchronizing circuit further comprises a compensation circuit for compensating phase errors in said reference signal during occurrences of pulses in the line synchronizing signal, said compensation circut generating a compensation signal, also applied to the control input of said signal generator, having a repetition frequency the same as that of said reference signal, whereby the signal at the control input of the signal generator is substantially constant throughout the period of the line synchronizing signal in the synchronous state of the phase control loop.

2. A circuit arrangement as claimed in claim 1, characterized in that said compensation circuit comprises said signal generator generating a further signal comprising pulses essentially having the same duration as the pulses in the line synchronizing signal and occurring substantially simultaneously with the pulses in the line synchronizing signal in the synchronous state of the control loop, and said phase discriminator circuit having a third input for receiving said further signal and comprising a first and a second phase discriminator, the first phase discriminator having a first input coupled to the first input of the phase discriminator circuit, and a second input coupled to the second input of the phase discriminator circuit, the second phase discriminator having a first input coupled to the third input of the phase discriminator circuit, and a second input coupled to the second input of the phase discriminator circuit, outputs of the first and second phase discriminators being coupled together and to the output of the phase discriminator circuit.

3. A circuit arrangement as claimed in claim 2, characterized in that an inverter stage is arranged between the second input of the phase discriminator circuit and the second input of the second phase discriminator, each output of the two phase discriminators being connected to an input of an adder stage, an output of which constitutes the output of the phase discriminator circuit.

4. A circuit arrangement as claimed in claim 2, characterized in that each output of the first and second phase discriminators is connected to an input of a subtractor stage, and output of which constitutes the output of the phase discriminator circuit.

5. A circuit arrangement as claimed in claim 1, characterized in that said loop filter contains a storage element and said compensation circuit comprises said signal generator generating a further signal comprising pulses essentially having the same duration as the pulses in the line synchronizing signal and occurring substantially simultaneously with the pulses in the line synchronizing signal in the synchronous state of the control loop, and said phase discriminator circuit having a third input for receiving said further signal and comprising a first source controlled by the signals at the first and second inputs of said phase discriminator circuit, and coupled to the output of said phase discriminator circuit for applying information to said storage element, and a second source controlled by the signals at the second and the third inputs of said phase discriminator circuit, and coupled to said output of said phase discriminator circuit for withdrawing information from said storage element, the resultant information present in the storage element constituting the control signal which is to be applied to the control input of the signal generator.

* * * * *